United States Patent
Zhang

(10) Patent No.: US 11,048,905 B2
(45) Date of Patent: Jun. 29, 2021

(54) METHOD FOR COLLECTING FINGERPRINT AND TERMINAL DEVICE

(71) Applicant: GUANGDONG OPPO MOBILE TELECOMMUNICATIONS CORP., LTD., Guangdong (CN)

(72) Inventor: Haiping Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/706,662

(22) Filed: Dec. 6, 2019

(65) Prior Publication Data

US 2020/0110918 A1    Apr. 9, 2020

Related U.S. Application Data

(63) Continuation of application No. PCT/CN2018/090670, filed on Jun. 11, 2018.

(30) Foreign Application Priority Data

Jun. 20, 2017    (CN) .......................... 201710474619.X

(51) Int. Cl.
*G06K 9/00* (2006.01)
*G06F 21/32* (2013.01)

(52) U.S. Cl.
CPC ............ *G06K 9/0004* (2013.01); *G06F 21/32* (2013.01)

(58) Field of Classification Search
CPC .................. G06F 21/32; G06K 9/00006–0012
See application file for complete search history.

(56) References Cited

U.S. PATENT DOCUMENTS

| | | | |
|---|---|---|---|
| 2005/0219200 A1 | 10/2005 | Weng | |
| 2018/0189540 A1* | 7/2018 | Chang | ................. G06K 9/0004 |
| 2018/0315799 A1* | 11/2018 | Jiang | ..................... H01L 27/323 |
| 2018/0357462 A1* | 12/2018 | Mackey | ............. G06K 9/00026 |
| 2019/0034020 A1* | 1/2019 | He | ..................... G06K 9/00107 |
| 2019/0034686 A1* | 1/2019 | Ling | ................. G06K 9/00053 |

(Continued)

FOREIGN PATENT DOCUMENTS

| | | |
|---|---|---|
| CN | 202632317 U | 12/2012 |
| CN | 103488939 A | 1/2014 |
| CN | 105912915 A | 8/2016 |

(Continued)

OTHER PUBLICATIONS

European search report EP18819933,dated Aug. 21, 2020(14 pages).

(Continued)

*Primary Examiner* — Casey L Kretzer

(57) ABSTRACT

A terminal device and a method for collecting a fingerprint are disclosed. The terminal device includes an optical fingerprint sensor and a touch display screen, wherein the touch display screen comprises a preset region, and the optical fingerprint sensor is disposed below the preset region, wherein brightness of light emitted from a light-emitting unit corresponding to the preset region of the touch display screen is greater than brightness of light emitted from other light-emitting unit corresponding to other region of the touch display screen, in response to an operation of the optical fingerprint sensor collecting a fingerprint.

17 Claims, 4 Drawing Sheets

(56) References Cited

U.S. PATENT DOCUMENTS

2020/0019804 A1* 1/2020 Kim .................. G06K 9/00912

FOREIGN PATENT DOCUMENTS

| | | |
|---|---|---|
| CN | 106326855 A | 1/2017 |
| CN | 106527949 A | 3/2017 |
| CN | 106599641 A | 4/2017 |
| CN | 106778707 A | 5/2017 |
| CN | 106791198 A | 5/2017 |
| CN | 107168469 A | 9/2017 |
| EP | 3608748 A1 | 2/2020 |

OTHER PUBLICATIONS

English Translation of First Office Action from China patent office in a counterpart Chinese patent Application 201710474619.X, dated Apr. 3, 2019 (10 pages).
English Translation of International search report issued in corresponding international application No. PCT/CN2018/090670, dated Oct. 9, 2018 (2 pages).
Partial Supplementary EP Search Report for EP application 18819933.5 dated May 20, 2020.

* cited by examiner

METHOD FOR COLLECTING FINGERPRINT AND TERMINAL DEVICE

CROSS-REFERENCE TO RELATED APPLICATION(S)

This application is a continuation application of International Patent Application No. PCT/CN2018/090670, filed on Jun. 11, 2018, which claims priority to Chinese Patent Application No. 201710474619.X, filed on Jun. 20, 2017, the contents of both which are herein incorporated by reference in their entireties.

TECHNICAL FIELD

The present disclosure generally relates to the field of electronic technologies, and in particular, to a method for collecting a fingerprint and a terminal device.

BACKGROUND

Nowadays, the fingerprint function has become a standard for terminal devices (such as smart phones), and even terminal devices without fingerprint function cannot keep up with the times. A fingerprint sensor (also known as fingerprint Sensor) is a key device for automatically collecting a fingerprint. According to the sensing principle, the fingerprint sensor is divided into an optical fingerprint sensor, a semiconductor capacitor sensor, an ultrasonic sensor, and the like.

Fingerprint recognition plays a crucial role in functions such as fingerprint unlocking and fingerprint payment. However, the quality of the fingerprint collected by the fingerprint sensor determines the success rate of fingerprint recognition. Therefore, how to improve the quality of the collected fingerprint is a technology problem that needs to be solved.

SUMMARY

In a first aspect of the present disclosure, a terminal device is provided, which includes an optical fingerprint sensor and a touch display screen, wherein the touch display screen includes a preset region, and the optical fingerprint sensor is disposed below the preset region, wherein brightness of light emitted from a light-emitting unit corresponding to the preset region of the touch display screen is greater than brightness of light emitted from other light-emitting unit corresponding to other region of the touch display screen, in response to an operation of the optical fingerprint sensor collecting a fingerprint.

In a second aspect of the present disclosure, a method for collecting a fingerprint is further provided. The method is applied to a terminal device including an optical fingerprint sensor, and a touch display screen, the touch display screen including a preset region, wherein the optical fingerprint sensor is disposed below the preset region. The method includes controlling a light-emitting unit corresponding to the preset region of the touch display screen to emit light, wherein brightness of the light emitted from the light-emitting unit corresponding to the preset region of the touch display screen is greater than brightness of light emitted from other light-emitting unit in other region of the touch display screen; and acquiring the fingerprint illuminated by the light emitted from the light-emitting unit corresponding to the preset region of the touch display screen.

In a third aspect of the present disclosure, a non-transitory storage medium is further provided, which stores one or more programs, when executed, causing a processor to perform a method for collecting a fingerprint, wherein the method includes: controlling a light-emitting unit corresponding to a preset region of a touch display screen to emit light having brightness that is greater than brightness of light emitted by a light-emitting unit in other region of the touch display screen, in response to an operation of an optical fingerprint sensor collecting a fingerprint; and acquiring the fingerprint illuminated by the light having brightness that is greater than brightness of light emitted by a light-emitting unit in other region of the touch display screen.

BRIEF DESCRIPTION OF DRAWINGS

In order to make the technical solution described in embodiments or background of the present disclosure more clearly, the drawings used for the description of the embodiments or background will be described.

DETAILED DESCRIPTION

Figure 1:
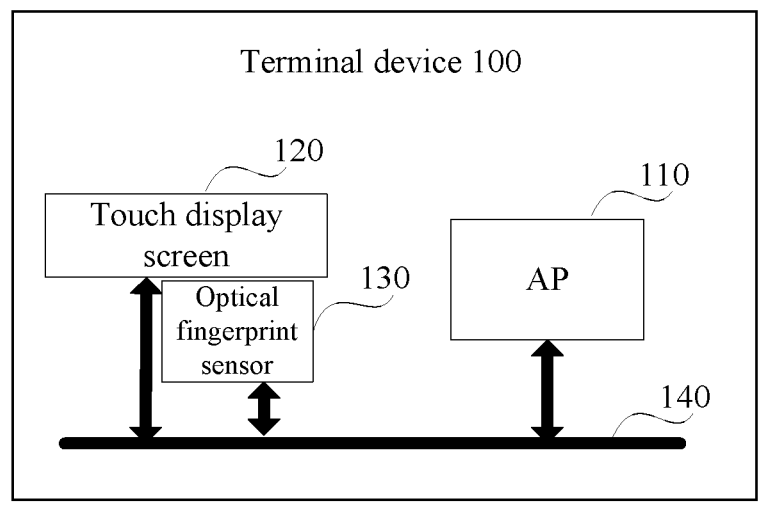
FIG. 1 is a schematic structural diagram of a terminal device according to embodiments of the present disclosure.

In order to better understand the present disclosure for those skilled in the art, the technical solutions in the embodiments of the present disclosure are clearly and completely described in conjunction with the drawings in the embodiments of the present disclosure. It is obvious that the described embodiments are only a part of the embodiments of the present disclosure, and not all embodiments. All other embodiments obtained by the ordinary skilled in the art based on the embodiments in the present disclosure without the creative work are all within the scope of the present disclosure.

The details are described in the following.

The terms "first", "second", "third", and "fourth" in the specification and claims of the present disclosure and the above drawings are used to distinguish different objects, and are not intended to describe a specific order. Furthermore, the terms "including" and "having", and any modification thereof are intended to cover unexclusive inclusion. For example, a process, method, system, product, or device that includes a series of steps or units is not limited to the listed steps or units, but optionally also includes steps or units not listed, or alternatively includes other steps or units inherent to these processes, methods, products, or equipment.

"Embodiment" herein means that a particular feature, structure, or characteristic described with reference to embodiments can be included in at least one embodiment of the present disclosure. The term appearing in various places in the specification are not necessarily referring to the same embodiment, and are not exclusive or alternative embodiments that are mutually exclusive with other embodiments. Those skilled in the art will understand explicitly and implicitly that the embodiments described herein can be combined with other embodiments.

A terminal device is provided, which includes an optical fingerprint sensor and a touch display screen, wherein the touch display screen includes a preset region, and the optical fingerprint sensor is disposed below the preset region, wherein brightness of light emitted from a light-emitting unit corresponding to the preset region of the touch display screen is greater than brightness of light emitted from other light-emitting unit corresponding to other region of the touch display screen, in response to an operation of the optical fingerprint sensor collecting a fingerprint.

In some embodiments, the light-emitting unit corresponding to the preset region of the touch screen includes a set of green sub-pixels, a set of red sub-pixels, and a set of blue sub-pixels; and sub-pixels in the set of green sub-pixels, the set of red sub-pixels, and the set of blue sub-pixels emit green light in response to the operation of the optical fingerprint sensor collecting the fingerprint.

In some embodiments, the light-emitting unit corresponding to the preset region of the touch screen includes a set of pixels and a set of spare sub-pixels; pixels in the set of pixels and spare sub-pixels in the set of spare sub-pixels emit light in response to the operation of the optical fingerprint sensor collecting the fingerprint; and the spare sub-pixels in the set of spare sub-pixels do not emit light in response to other operations of the optical fingerprint sensor not collecting the fingerprint.

In some embodiments, each of the pixels in the set of pixels includes a green sub-pixel, a red sub-pixel, and a blue sub-pixel, a grid is between any two adjacent sub-pixels.

In some embodiments, each of the spare sub-pixels in the set of spare sub-pixels is disposed in one grid; and each of the spare sub-pixels in the set of spare sub-pixels is configured for emitting light with a single color.

In some embodiments, the single color is a single green, a single red, or a single blue.

In some embodiments, the set of spare sub-pixels includes a plurality of spare blue sub-pixels and a plurality of spare red sub-pixels; wherein each of the spare red sub-pixels is disposed in a corresponding one grid between a green sub-pixel and a red sub-pixel in the set of pixels which are adjacent to each other; each of the spare blue sub-pixels is disposed in a corresponding one grid between a green sub-pixel and a blue sub-pixel in the set of pixels which are adjacent to each other, and/or each of the spare blue sub-pixel is disposed in a corresponding one grid between a green sub-pixel and a red sub-pixel in the set of pixels which are adjacent to each other.

A method for collecting a fingerprint is further provided. The method is applied to a terminal device including an optical fingerprint sensor, and a touch display screen, the touch display screen including a preset region, wherein the optical fingerprint sensor is disposed below the preset region. The method includes controlling a light-emitting unit corresponding to the preset region of the touch display screen to emit light, wherein brightness of the light emitted from the light-emitting unit corresponding to the preset region of the touch display screen is greater than brightness of light emitted from other light-emitting unit in other region of the touch display screen; and acquiring the fingerprint illuminated by the light emitted from the light-emitting unit corresponding to the preset region of the touch display screen.

In some embodiments, the light-emitting unit corresponding to the preset region of the touch screen includes a set of green sub-pixels, a set of red sub-pixels and a set of blue sub-pixels; and the controlling the light-emitting unit corresponding to the preset region of the touch display screen to emit light includes: controlling sub-pixels in the set of green sub-pixels, the set of red sub-pixels, and the set of blue sub-pixels emit green light.

In some embodiments, the light-emitting unit corresponding to the preset region of the touch screen includes a set of pixels and a set of spare sub-pixels; and the controlling the light-emitting unit corresponding to the preset region of the touch display screen to emit light includes: controlling pixels in the set of pixels and spare sub-pixels in the set of spare sub-pixels emit light, wherein the spare sub-pixels in the set of spare sub-pixels do not emit light when the fingerprint is not collected.

In some embodiments, each of the pixels in the set of pixels includes a green sub-pixel, a red sub-pixel, and a blue sub-pixel, a grid is between any two adjacent sub-pixels.

In some embodiments, each of the spare sub-pixels in the set of spare sub-pixels is disposed in one grid; and each of the spare sub-pixels in the set of spare sub-pixels is configured for emitting light with a single color.

In some embodiments, the single color is a single green, a single red, or a single blue.

In some embodiments, the set of spare sub-pixels includes a plurality of spare blue sub-pixels and a plurality of spare red sub-pixels; wherein each of the spare red sub-pixels is disposed in a corresponding one grid between a green sub-pixel and a red sub-pixel in the set of pixels which are adjacent to each other; each of the spare blue sub-pixels is disposed in a corresponding one grid between a green sub-pixel and a blue sub-pixel in the set of pixels which are adjacent to each other, and/or each of the spare blue sub-pixel is disposed in a corresponding one grid between a green sub-pixel and a red sub-pixel in the set of pixels which are adjacent to each other.

In some embodiments, the acquired fingerprint illuminated by the light emitted by the light-emitting unit corresponding to the preset region of the touch display screen is a fingerprint of a dry finger.

In some embodiments, the method further includes controlling the light-emitting unit corresponding to the preset region of the touch display screen to emit light having a target brightness, wherein the target brightness is making the touch display screen is normally displayed; acquiring another fingerprint illuminated by the light having the target brightness; determining whether sharpness of the another fingerprint illuminated by the light having the target brightness is less than a preset threshold; and performing the controlling the light-emitting unit in the preset region of the touch display screen to emit light having brightness that is greater than brightness of light emitted by a light-emitting unit in other region of the touch display screen when the sharpness of the another fingerprint is less than the preset threshold.

A non-transitory storage medium is further provided, which stores one or more programs, when executed, causing a processor to perform a method for collecting a fingerprint, wherein the method includes: controlling a light-emitting unit corresponding to a preset region of a touch display screen to emit light having brightness that is greater than brightness of light emitted by a light-emitting unit in other region of the touch display screen, in response to an operation of an optical fingerprint sensor collecting a fingerprint; and acquiring the fingerprint illuminated by the light having a brightness that is greater than brightness of light emitted by a light-emitting unit in other region of the touch display screen.

In some embodiments, the light-emitting unit corresponding to the preset region of the touch screen includes a set of green sub-pixels, a set of red sub-pixels, and a set of blue sub-pixels; and sub-pixels in the set of green sub-pixels, the set of red sub-pixels, and the set of blue sub-pixels emit green light in response to the operation of the optical fingerprint sensor collecting the fingerprint.

In some embodiments, the light-emitting unit corresponding to the preset region of the touch screen includes a set of pixels and a set of spare sub-pixels; pixels in the set of pixels and spare sub-pixels in the set of spare sub-pixels emit light in response to the operation of the optical fingerprint sensor collecting the fingerprint; and the spare sub-pixels in the set of spare sub-pixels do not emit light in response to other operations of the optical fingerprint sensor not collecting the fingerprint.

In some embodiments, each of the pixels in the set of pixels includes a green sub-pixel, a red sub-pixel, and a blue sub-pixel, a grid is between any two adjacent sub-pixels. The set of spare sub-pixels includes a plurality of spare blue sub-pixels and a plurality of spare red sub-pixels; wherein each of the spare red sub-pixels is disposed in a corresponding one grid between a green sub-pixel and a red sub-pixel in the set of pixels which are adjacent to each other; each of the spare blue sub-pixels is disposed in a corresponding one grid between a green sub-pixel and a blue sub-pixel in the set of pixels which are adjacent to each other, and/or each of the spare blue sub-pixel is disposed in a corresponding one grid between a green sub-pixel and a red sub-pixel in the set of pixels which are adjacent to each other.

A terminal device, also known as a user equipment (UE), is a device for providing voice and/data connectivity for a user, for example, a handheld device or in-vehicle equipment having wireless connection capability. Common terminals, for example, includes a mobile phone, a tablet PC, a laptop, a PDA, a mobile Internet devices (MID), a wearable device such as a smart watcher, a smart bracelet, or a pedometer.

Embodiments of the present disclosure are described below in conjunction with the accompanying drawings in embodiments of the present disclosure.

FIG. 1 is a schematic structural diagram of a terminal device 100 according to embodiments of the present disclosure. The terminal device 100 includes an application processor (AP) 110, an optical fingerprint sensor 130, and a touch display screen 120. The touch display screen 120 includes a preset region. The optical fingerprint sensor 130 is disposed below the preset region. When the optical fingerprint sensor 130 collects a fingerprint, brightness of light emitted from a light-emitting unit corresponding to the preset region of the touch display screen 120 is greater than brightness of light emitted from other light-emitting unit corresponding to other region of the touch display screen 120. That is, brightness of light emitted from a light-emitting unit corresponding to the preset region of the touch display screen 120 is greater than brightness of light emitted from other light-emitting unit corresponding to other region of the touch display screen 120 response to an operation of the optical fingerprint sensor 130 collecting a fingerprint.

In an example, the touch display screen 120 is one of an LCD display, an OLED display, and an LED display.

In an example, the maximum size of the preset region is the entire touch display screen, and the minimum size is an area that enables the user to input a fingerprint with a sufficient area, which is not limited in the present disclosure.

In an example, the preset region may be disposed at a lower left corner of the touch display screen 120, a lower right corner of the touch display screen 120, or an upper right corner of the touch display screen 120, which is not limited in the present disclosure.

In an example, the shape of the preset region may be a circular, a square, an elliptical, a diamond, or the like, which is not limited in the present disclosure.

In an example, the number of the preset regions may be one or plural, which is not limited in the present disclosure.

Figure 2:
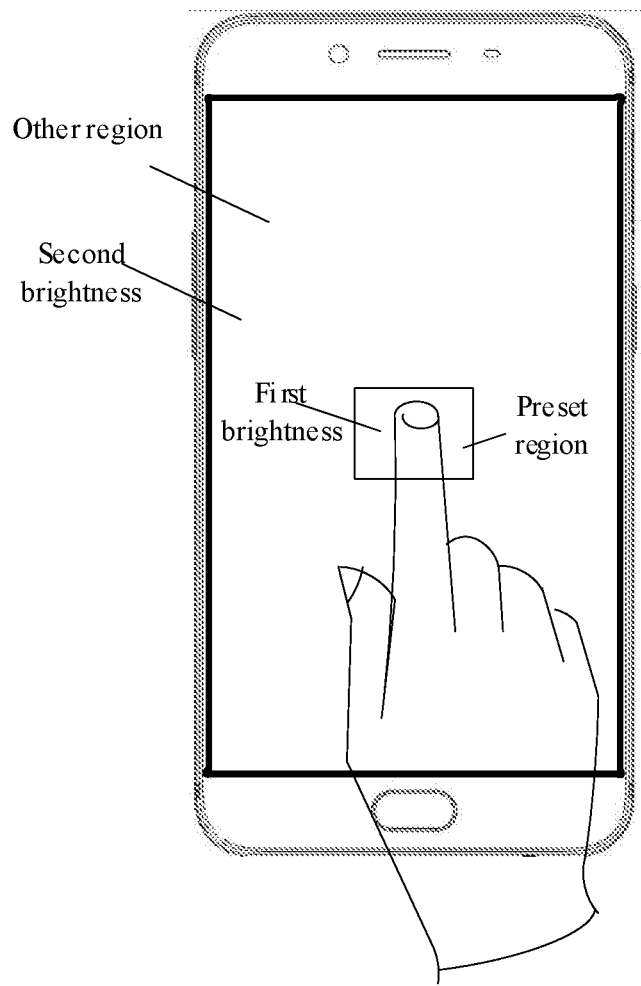
FIG. 2 is a schematic view of an interface according to embodiments of the present disclosure.

Specifically, when a user's finger presses on the touch display screen 120 of the terminal device 100, different critical states formed on a contact surface are: 1) a "skin-display screen" interface formed as the raised fingerprint ridge line contacts the touch display screen 120; and 2) an "air-display screen" interface formed as recessed fingerprint valleys contacts the touch display screen 120. Under the illumination of the touch display screen 120, the reflectance of the "skin-display screen" interface is small, and the reflectivity of the "air-display screen" interface is large, such that a fingerprint image in bright and dark is formed. For example, as shown in FIG. 2, FIG. 2 is a schematic view of an interface according to embodiments of the present disclosure. When the fingerprint is collected, the AP 110 controls the light-emitting unit corresponding to the preset region to emit light, and brightness of the emitted light is called as a first brightness. The AP 110 controls the light-emitting units corresponding to other region to emit light, and brightness of the emitted light is called as a second brightness. The first brightness is greater than the second brightness. Given that the first brightness is equal to the second brightness, both of them are brightness of the touch display when the touch display is normally displayed. Given that the brightness of the touch display when the touch display is normally displayed is 50 lux, the reflectivity of the "skin-display" interface is 30%, the reflectivity of the "air-display" interface is 80%, then the brightness of the reflected light from the "skin-display" interface is 15 lux, and the brightness of reflected light from the "air-display screen" interface is 40 lux. When the fingerprint is collected, given that the first brightness is equal to the second brightness, the second brightness is brightness of the touch display when the touch display is normally displayed. Given that the second brightness is 50 lux and the first brightness is 80 lux, the reflectivity of the "skin-display" interface is still 30%, the reflectivity of the "air-display" interface is still 80%, then the brightness of the reflected light from the "skin-display" interface is 24 lux, and the brightness of reflected light from the "air-display screen" interface is 64 lux. As it can be seen, the first brightness is brightness of the touch display when the touch display is normally displayed, and the first brightness is equal to 50 lux, then the difference of brightness of two kinds of reflected light is 25. Given that the brightness of the light illuminating the fingerprint of the user is increased to 80 lux, the difference of brightness of two kind reflected light is 40. The more the brightness of the light reflected from the two interfaces is different, the greater the contrast is, which indicates that the more obvious the distinction between the two interfaces is, and the clearer the collected fingerprint is. So, when the fingerprint is collected, the brightness of light illuminating the fingerprint of the user is increased, and the quality of the collected fingerprints can be improved.

The brightness of light emitted from the light-emitting unit-corresponding to the other region of the touch display screen 120 is brightness of the touch display screen when the touch display screen is normally displayed.

The brightness of the touch display screen when the touch display screen 120 is normally displayed refers to the display brightness for display set in the display setting of the terminal device 100. When the user views videos, short messages, and news by the terminal device 100, the display brightness of the touch display screen 120 is the brightness when it is in the normal display (i.e., the display brightness for display set in the display setting of the terminal device 100).

In one example, the light-emitting unit corresponding to the preset region of the touch screen 120 includes a set of green sub-pixels, a set of red sub-pixels, and a set of blue sub-pixels. When the optical fingerprint sensor 130 collects a fingerprint, all of the sub-pixels included in the set of green sub-pixels, the set of red sub-pixels, and the set of blue sub-pixels emit green light.

Specifically, the touch display screen 120 is arranged in an "RGB" arrangement, and one "RGB" is a pixel, and each pixel includes a green sub-pixel, a red sub-pixel, and a blue sub-pixel. The green is a color with the least human skin, light emitted from the green sub-pixel is brighter than light emitted from the red sub-pixels. In addition, compared with the green sub-pixel, the red sub-pixel and the blue sub-pixel have a larger area. When it is needed to increase brightness illuminating the fingerprint of the user, the sub-pixels included in the set of green sub-pixels, the set of red sub-pixels, and the set of blue sub-pixels are controlled to emit green lights. Compared with a case where the green sub-pixels included in the set of green sub-pixels are controlled to emit green light, a case where the red sub-pixels included in the set of red sub-pixels are controlled to emit red light, and a case where the blue sub-pixels included in the set of blue sub-pixels are controlled to emit blue light, all of sub-pixels are just controlled to emit green lights in the present embodiment, which increases the brightness illuminating the fingerprint of the user and then improve quality of the fingerprint under a case the power consumption of the terminal device is kept constant.

In an example, the light-emitting unit corresponding to the preset region of the touch display screen 120 includes a set of pixels and a set of spare sub-pixels. When the optical fingerprint sensor 130 collects a fingerprint, pixels in the set of pixels and spare sub-pixels in the set of spare sub-pixels emit light. The spare sub-pixels included in the set of spare sub-pixels do not emit light when the optical fingerprint sensor does not collect a fingerprint.

Specifically, the spare sub-pixels are arranged in the preset region. When it is needed to increase brightness illuminating the fingerprint of the user, the pixels in the set of pixels and the spare sub-pixels in the set of spare sub-pixels are controlled to emit light. Compared with a case where the pixels in the set of pixels are only controlled to emit light, the pixels in the set of pixels and the spare sub-pixels in the set of spare sub-pixels are controlled to emit light, which increases the brightness illuminating the fingerprint of the user and then improve quality of the fingerprint.

Further, the set of pixels includes a plurality of pixels, each of which includes a green sub-pixel, a red sub-pixel, and a blue sub-pixel, and there exists a grid between any two adjacent sub-pixels. The set of spare sub-pixels includes a plurality of spare sub-pixels, and each spare sub-pixel is disposed in one grid.

Figure 3:
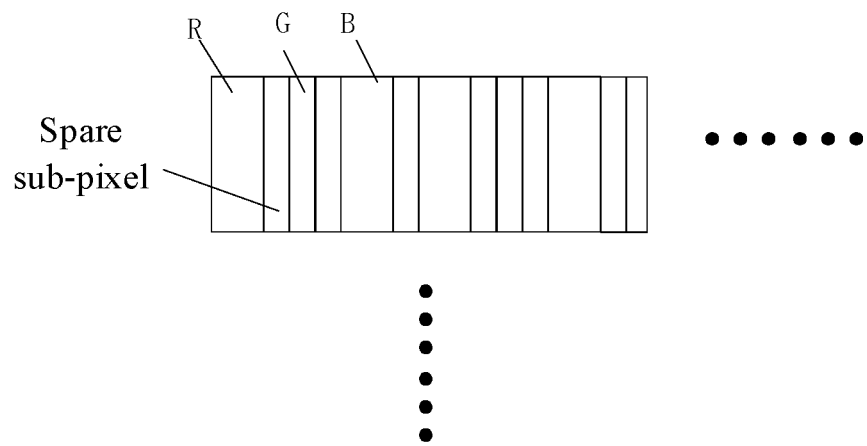
FIG. 3 is a schematic view of spare sub-pixels according to embodiments of the present disclosure.

Specifically, as shown in FIG. 3, FIG. 3 is a schematic view of spare sub-pixels according to embodiments of the present disclosure. The touch display screen 120 is arranged in an "RGB" arrangement, and one "RGB" is a pixel, and each pixel includes a green sub-pixel, a red sub-pixel, and a blue sub-pixel. There is a black gap between one sub-pixel and one sub-pixel, which cannot emit light. These gaps are called as the "grids". In this embodiment, the spare sub-pixels are disposed in the grids.

Further, each spare sub-pixel is a spare sub-pixel for emitting light with a single color.

Further, the single color is a single green, a single red, or a single blue.

Specifically, when only the green sub-pixels are disposed in the grids, since the green is a color with the least human skin and light emitted from the green sub-pixels is brighter than light emitted from the red sub-pixels, in order to increase the brightness of the light used to illuminate the user's fingerprint, only the spare green sub-pixels are disposed in the grids.

Further, the plurality of spare sub-pixels includes a plurality of spare blue sub-pixels and a plurality of spare red sub-pixels. A spare red sub-pixel is disposed in corresponding one gird between a green sub-pixel and a red sub-pixel which are adjacent to each other. A spare blue sub-pixel is disposed in corresponding one grid between a green sub-pixel and a blue sub-pixel which are adjacent to each other, or the spare blue sub-pixel is disposed in corresponding one gird between a red sub-pixel and a blue sub-pixel which are adjacent to each other.

Figure 4:
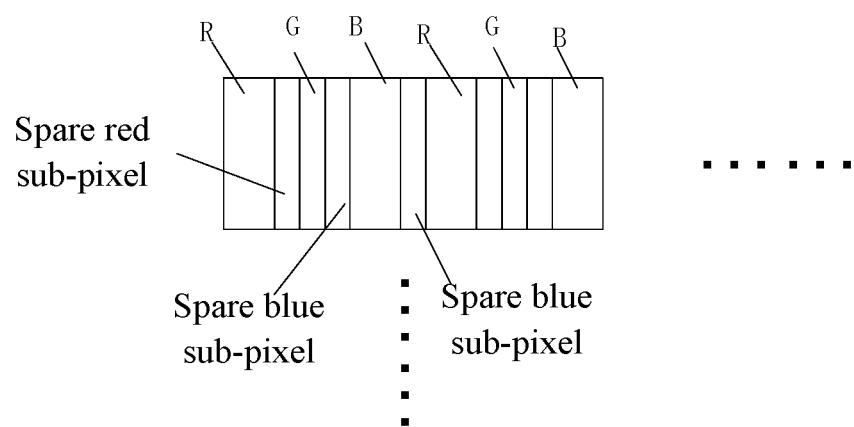
FIG. 4 is a schematic view of another spare sub-pixels according to embodiments of the present disclosure.

Specifically, as shown in FIG. 4, for three emitting-light pixels of RGB display screen, which are a green sub-pixel, a red sub-pixel, and a blue sub-pixel, the green sub-pixel has the longest lifetime, followed by lifetime of the red sub-pixel and then lifetime of the blue sub-pixel. In this embodiment, a spare red sub-pixel is disposed in a gird between a green sub-pixel and a red sub-pixel which are adjacent to each other, a spare blue sub-pixel is disposed in a grid between a green sub-pixel and a blue sub-pixel which are adjacent to each other, or the spare blue sub-pixel is disposed in a gird between a red sub-pixel and a blue sub-pixel which are adjacent to each other. Thus, the spare red sub-pixel or the spare blue sub-pixel not only increases the brightness for illuminating the fingerprint of the user when it is required to increase the brightness for illuminating the fingerprint of the user, but also acts as a normal red sub-pixel or blue sub-pixel when the normal red sub-pixel or blue sub-pixel fails, which extending the life of the touch display screen.

For example, assuming that the target brightness is 50 lux, firstly, the AP 110 controls the light-emitting unit corresponding to the preset region to emit 50 lux light, 50 lux light is used to illuminate the fingerprint of the user. Then the optical fingerprint sensor 130 collects the user's fingerprint illuminated by 50 lux light. At this time, if the sharpness of the user's fingerprint collected is less than the preset threshold, it is determined that the user's finger is a dry finger. With the same brightness of light, the collected fingerprint of the dry finger is less sharp than the collected fingerprint of a normal finger. So, in order to improve the sharpness of the collected fingerprint, the AP 110 controls the light-emitting unit corresponding to the preset region to emit light higher than 50 lux light, and then the optical fingerprint sensor 130 collects the user's fingerprint illuminated by light higher than 50 lux light.

Figure 5:
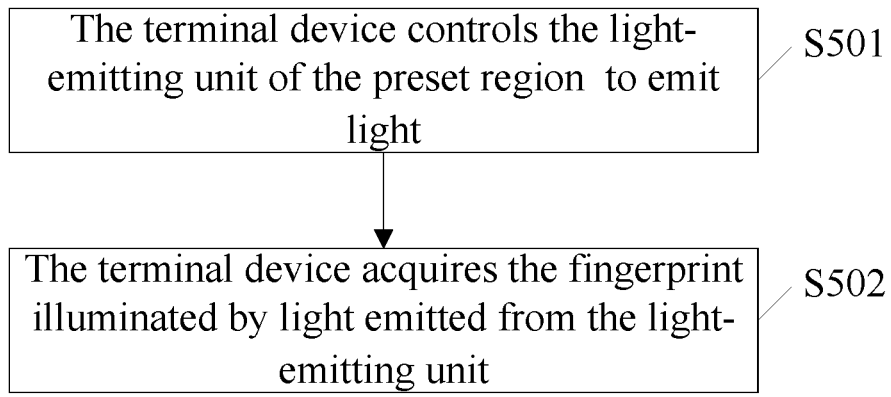
FIG. 5 is a schematic flowchart of a method for collecting a fingerprint according to embodiments of the present disclosure.

FIG. 5 is a schematic flowchart of a method for collecting a fingerprint according to embodiments of the present disclosure, which is applied to a terminal device. The terminal includes an application processor (AP), an optical fingerprint sensor, and a touch display screen. The touch display screen includes a preset region. The optical fingerprint sensor is disposed below the preset region. The method includes actions/operations in the following block.

At block S501, the terminal device controls the light-emitting unit corresponding to the preset region of the touch display screen to emit light, wherein brightness of light emitted from a light-emitting unit corresponding to the preset region of the touch display screen is greater than brightness of light emitted from other light-emitting unit corresponding to other region of the touch display screen.

At block S502, the terminal device acquires the fingerprint illuminated by light emitted from the light-emitting unit corresponding to the preset region of the touch display screen.

In an example, the touch display screen is one of an LCD display, an OLED display, and an LED display.

In an example, the maximum size of the preset region is the entire touch display screen, and the minimum size is an area that enables the user to input a fingerprint with a sufficient area, which is not limited in the present disclosure.

In an example, the preset region may be disposed at a lower left corner of the touch display screen, a lower right corner of the touch display screen, or an upper right corner of the touch display screen, which is not limited in the present disclosure.

In an example, the shape of the preset region may be a circular, a square, an elliptical, a diamond, or the like, which is not limited in the present disclosure.

In an example, the number of the preset regions may be one or plural, which is not limited in the present disclosure.

Specifically, when a user's finger presses on the touch display screen of the terminal device, different critical states formed on a contact surface are: 1) a "skin-display screen" interface formed as the raised fingerprint ridge line contacts the touch display screen; and 2) a "air-display screen" interface formed as recessed fingerprint valleys contacts the touch display screen. Under the illumination of the touch display screen, the reflectance of the "skin-display screen" interface is small, and the reflectivity of the "air-display screen" interface is large, such that a fingerprint image in bright and dark is formed. For example, as shown in FIG. 2, FIG. 2 is a schematic view of an interface according to embodiments of the present disclosure. When the fingerprint is collected, the AP 110 controls the light-emitting unit corresponding to the preset region to emit light, and brightness of the emitted light is called as a first brightness. The AP 110 controls the light-emitting units corresponding to other region to emit light, and brightness of the emitted light is called as a second brightness. The first brightness is greater than the second brightness. Given that the first brightness is equal to the second brightness, both of them are brightness of the touch display when the touch display is normally displayed. Given that the brightness of the touch display when the touch display is normally displayed is 50 lux, the reflectivity of the "skin-display" interface is 30%, the reflectivity of the "air-display" interface is 80%, then the brightness of the reflected light from the "skin-display" interface is 15, and the brightness of reflected light from the "air-display screen" interface is 40 lux. When the fingerprint is collected, given that the first brightness is equal to the second brightness, the second brightness is brightness of the touch display when the touch display is normally displayed.

Given that the second brightness is 50 lux and the first brightness is 80 lux, the reflectivity of the "skin-display" interface is still 30%, the reflectivity of the "air-display" interface is still 80%, then the brightness of the reflected light from the "skin-display" interface is 24, and the brightness of reflected light from the "air-display screen" interface is 64 lux. As it can be seen, the first brightness is brightness of the touch display when the touch display is normally displayed, and the first brightness is equal to 50 lux, then the difference of brightness of two kind reflected light is 25. Given that the brightness of the light illuminating the fingerprint of the user is increased to 80 lux, the difference of brightness of two kind reflected light is 40. The more the brightness of the light reflected from the two interfaces is different, the greater the contrast is, which indicates that the more obvious the distinction between the two interfaces is, and the clearer the collected fingerprint is. So, when the fingerprint is collected, the brightness of light illuminating the fingerprint of the user is increased, and the quality of the collected fingerprints can be improved.

The brightness of light emitted from the light-emitting unit-corresponding to the other region of the touch display screen is brightness of the touch display screen when the touch display screen is normally displayed.

The brightness of the touch display screen when the touch display screen is normally displayed refers to the display brightness for display set in the display setting of the terminal device. When the user views videos, short messages, and news by the terminal device, the display brightness of the touch display screen is the brightness when it is in the normal display (i.e., the display brightness for display set in the display setting of the terminal device).

In an example, the terminal device controls the emitting-light unit corresponding to the preset region of the touch display screen to emit light, which includes that he terminal device controls the emitting-light unit corresponding to the preset region of the touch display screen to emit light when the user's finger is determined to be a dry finger.

Specifically, when the user's finger is a dry finger, there are less grease and moisture between the skin and the touch display screen. An "air-display screen" interface formed as the raised fingerprint ridge line contacts the touch display screen, and the reflectivity of a "skin-display screen" interface is large, such that the difference between reflectivity of the two interfaces is reduced, and then the distinction between the two interfaces is reduced. Thus, sharpness of the collected fingerprint is reduced, and then the quality of the collected fingerprints can be decreased. For example, supposed that the reflectivity of the "skin-display" interface of a normal finger is 30%, the reflectivity of the "air-display" interface of the normal finger is 80%, and brightness for illuminating the fingerprint of the user is 50 lux, then the brightness of the reflected light from the "skin-display" interface of the normal finger is 15 lux, the brightness of reflected light from the "air-display screen" interface of the normal finger is 40 lux, and the difference of brightness of two kinds of reflected light for the normal finger is 25. Supposed that the reflectivity of the "skin-display" interface of a dry finger is 40%, the reflectivity of the "air-display" interface of the dry finger is 80%, and brightness for illuminating the fingerprint of the user is 50 lux, then the brightness of the reflected light from the "skin-display" interface of the dry finger is 20 lux, the brightness of reflected light from the "air-display screen" interface of the dry finger is 40 lux, and the difference of brightness of two kinds of reflected light for the dry finger is 20.

At this time, the brightness used for illuminating the fingerprint of the user is increased from 50 lux to 80 lux. Given that the reflectivity of the "skin-display" interface of the dry finger is still 30%, the reflectivity of the "air-display" interface of the dry finger is still 80%, then the brightness of the reflected light from the "skin-display" interface of the dry finger is 24 lux, and the brightness of reflected light from the "air-display screen" interface of the dry finger is 64 lux, and the difference of brightness of two kinds of reflected light for the dry finger is 32.

It can be seen that in the case of the dry finger, the brightness used for illuminating the fingerprint of the user is increased, so that the brightness of the reflected light from the two interfaces is greatly different. The more the brightness of the light reflected from the two interfaces is different, the more obvious the distinction between the two interfaces is, and the clearer the collected fingerprint is. Thus, the quality of the collected fingerprint is improved.

A finger having a certain amount of oil and moisture in the skin epidermis is a normal finger, and a finger having less amount of oil and moisture in the skin epidermis on the skin's epidermis compared with the normal finger is a dry finger.

In an example, the method further includes actions/operations in the following.

The terminal device controls the light-emitting unit corresponding to the preset region of the touch display screen to emit light having a target brightness, wherein the target brightness is brightness of the touch display screen when the touch display screen is normally displayed and configured for illuminating the fingerprint of the user.

The terminal device acquires the fingerprint illuminated by the light having the target brightness emitted from the light-emitting unit corresponding to the preset region of the touch display screen.

The user's finger is determined as a dry finger when sharpness of the acquired fingerprint under the light having the target brightness is less than a preset threshold.

Specifically, before increasing the brightness of the light for illuminating the fingerprint of the user, it is first determined whether the finger of the user is a dry finger, and if it is a dry finger, it is necessary to increase the brightness of the light for illuminating the fingerprint of the user. Under the same brightness, sharpness of the collected fingerprint of the normal finger by the optical fingerprint sensor will be higher than sharpness of the collected fingerprint of the dry finger. Therefore, with sharpness of the collected fingerprint, whether it is a dry finger can be determined.

Further, the preset threshold is a sharpness of the collected fingerprint of the normal finger under the illumination of the target brightness.

In an example, the light-emitting unit corresponding to the preset region of the touch screen includes a set of green sub-pixels, a set of red sub-pixels, and a set of blue sub-pixels. The terminal device controls the light-emitting unit corresponding to the preset region of the touch display screen to emit light, which specifically includes that the terminal device controls sub-pixels in the set of green sub-pixels, the set of red sub-pixels, and the set of blue sub-pixels emit green light.

Specifically, the touch display screen is arranged in an "RGB" arrangement, and one "RGB" is a pixel, and each pixel includes a green sub-pixel, a red sub-pixel, and a blue sub-pixel. The green is a color with the least human skin, light emitted from the green sub-pixel is brighter than light emitted from the red sub-pixels. In addition, compared with the green sub-pixel, the red sub-pixel and the blue sub-pixel have a larger area. When it is needed to increase brightness illuminating the fingerprint of the user, the sub-pixels included in the set of green sub-pixels, the set of red sub-pixels, and the set of blue sub-pixels are controlled to emit green lights. Compared with a case where the green sub-pixels included in the set of green sub-pixels are controlled to emit green light, a case where the red sub-pixels included in the set of red sub-pixels are controlled to emit red light, and a case where the blue sub-pixels included in the set of blue sub-pixels are controlled to emit blue light, all of sub-pixels are just controlled to emit green lights in the present embodiment, which increases the brightness illuminating the fingerprint of the user and then improve quality of the fingerprint under a case the power consumption of the terminal device is kept constant.

In an example, the light-emitting unit corresponding to the preset region of the touch display screen includes a set of pixels and a set of spare sub-pixels. The terminal device controls the light-emitting unit corresponding to the preset region of the touch display screen to emit light, which specifically includes in the following.

The terminal device controls pixels in the set of pixels and spare sub-pixels in the set of spare sub-pixels emit light, wherein the spare sub-pixels included in the set of spare sub-pixels do not emit light when the fingerprint is not collected.

Specifically, the spare sub-pixels are arranged in the preset region. When it is needed to increase brightness illuminating the fingerprint of the user, the pixels in the set of pixels and the spare sub-pixels in the set of spare sub-pixels are controlled to emit light. Compared with a case where the pixels in the set of pixels are only controlled to emit light, the pixels in the set of pixels and the spare sub-pixels in the set of spare sub-pixels are controlled to emit light, which increases the brightness illuminating the fingerprint of the user and then improve quality of the fingerprint.

Further, the set of pixels includes a plurality of pixels, each of which includes a green sub-pixel, a red sub-pixel, and a blue sub-pixel, and there exists a grid between any two adjacent sub-pixels. The set of spare sub-pixels includes a plurality of spare sub-pixels, and each spare sub-pixel is disposed in one grid.

Specifically, as shown in FIG. 3, the touch display screen is arranged in an "RGB" arrangement, and one "RGB" is a pixel, and each pixel includes a green sub-pixel, a red sub-pixel, and a blue sub-pixel. There is a black gap between one sub-pixel and one sub-pixel, which cannot emit light. These gaps are called as the "grids". In this embodiment, the spare sub-pixels are disposed in the grids.

Further, each spare sub-pixel is a spare sub-pixel for emitting light with a single color.

Further, the single color is a single green, a single red, or a single blue.

Specifically, when only the green sub-pixels are disposed in the grids, since the green is a color with the least human skin and light emitted from the green sub-pixels is brighter than light emitted from the red sub-pixels, in order to increase the brightness of the light used to illuminate the user's fingerprint, only the spare green sub-pixels are disposed in the grids.

Further, the plurality of spare sub-pixels includes a plurality of spare blue sub-pixels and a plurality of spare red sub-pixels. A spare red sub-pixel is disposed in corresponding one gird between a green sub-pixel and a red sub-pixel which are adjacent to each other. A spare blue sub-pixel is disposed in corresponding one grid between a green sub-pixel and a blue sub-pixel which are adjacent to each other, or the spare blue sub-pixel is disposed in corresponding one gird between a red sub-pixel and a blue sub-pixel which are adjacent to each other.

Specifically, as shown in FIG. 4, for three emitting-light pixels of RGB display screen, which are a green sub-pixel, a red sub-pixel, and a blue sub-pixel, the green sub-pixel has the longest lifetime, followed by lifetime of the red sub-pixel and then lifetime of the blue sub-pixel. In this embodiment, a spare red sub-pixel is disposed in a gird between a green sub-pixel and a red sub-pixel which are adjacent to each other, a spare blue sub-pixel is disposed in a grid between a green sub-pixel and a blue sub-pixel which are adjacent to each other, or the spare blue sub-pixel is disposed in a gird between a red sub-pixel and a blue sub-pixel which are adjacent to each other. Thus, the spare red sub-pixel or the spare blue sub-pixel not only increases the brightness for illuminating the fingerprint of the user when it is required to increase the brightness for illuminating the fingerprint of the user, but also acts as a normal red sub-pixel or blue sub-pixel when the normal red sub-pixel or blue sub-pixel fails, which extending the life of the touch display screen.

For example, assuming that the target brightness is 50 lux, firstly, the AP 110 controls the light-emitting unit corresponding to the preset region to emit 50 lux light, 50 lux light is used to illuminate the fingerprint of the user. Then the optical fingerprint sensor 130 collects the user's fingerprint illuminated by 50 lux light. At this time, if the sharpness of the user's fingerprint collected is less than the preset threshold, it is determined that the user's finger is a dry finger. With the same brightness of light, the collected fingerprint of the dry finger is less sharp than the collected fingerprint of a normal finger. So, in order to improve the sharpness of the collected fingerprint, the AP 110 controls the light-emitting unit corresponding to the preset region to emit light higher than 50 lux light, and then the optical fingerprint sensor 130 collects the user's fingerprint illuminated by light higher than 50 lux light.

Figure 6:
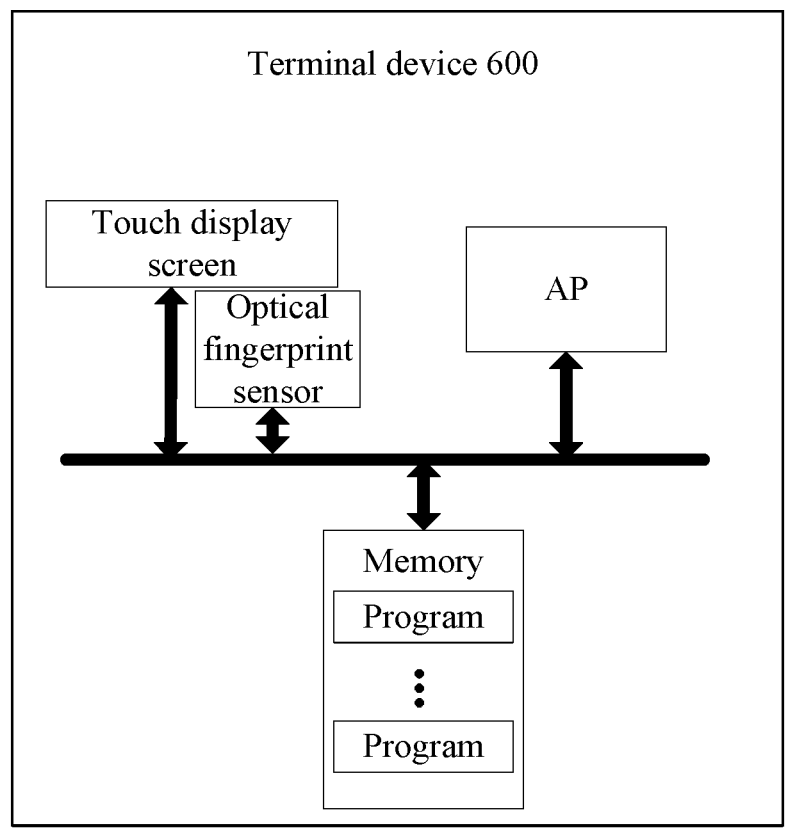
FIG. 6 is a schematic structural diagram of another terminal device according to embodiments of the present disclosure.

FIG. 6 is a schematic structural diagram of another terminal device 600 according to embodiments of the present disclosure. The terminal device includes an application processor (AP), an optical fingerprint sensor, a touch display screen, at least one non-transitory memory, and one or more programs. The touch display screen includes a preset region. The optical fingerprint sensor is disposed below the preset region.

The one or more programs are stored in the memory and are configured to be executed by the AP, and the program includes instructions for performing actions/operations in the following.

Controlling the light-emitting unit corresponding to the preset region of the touch display screen to emit light, wherein brightness of light emitted from a light-emitting unit corresponding to the preset region of the touch display screen is greater than brightness of light emitted from other light-emitting unit corresponding to other region of the touch display screen.

Acquiring the fingerprint illuminated by light emitted from the light-emitting unit corresponding to the preset region of the touch display screen.

In an example, in an aspect of the controlling a light-emitting unit corresponding to the preset region of the touch display screen to emit light, the program specifically includes instructions for performing actions/operations in the following.

Controlling a light-emitting unit in the preset region of the touch display screen to emit light when a user's finger is determined as a dry finger.

In an example, the light-emitting unit corresponding to the preset region of the touch screen includes a set of green sub-pixels, a set of red sub-pixels, and a set of blue sub-pixels. In an aspect of the controlling a light-emitting unit corresponding to the preset region of the touch display screen to emit light, the program specifically includes instructions for performing actions/operations in the following.

Controlling sub-pixels in the set of green sub-pixels, the set of red sub-pixels, and the set of blue sub-pixels emit green light.

In an example, the light-emitting unit corresponding to the preset region of the touch display screen includes a set of pixels and a set of spare sub-pixels. In an aspect of the controlling a light-emitting unit corresponding to the preset region of the touch display screen to emit light, the program specifically includes instructions for performing actions/operations in the following.

Controlling pixels in the set of pixels and spare sub-pixels in the set of spare sub-pixels emit light.

The spare sub-pixels included in the set of spare sub-pixels do not emit light when the fingerprint is not collected.

In an example, the set of pixels includes a plurality of pixels, each of which includes a green sub-pixel, a red sub-pixel, and a blue sub-pixel, and there exists a grid between any two adjacent sub-pixels. The set of spare sub-pixels includes a plurality of spare sub-pixels, and each spare sub-pixel is disposed in one grid.

In an example, each spare sub-pixel is a spare sub-pixel for emitting light with a single color.

In an example, the single color is a single green, a single red, or a single blue.

In an example, the plurality of spare sub-pixels includes a plurality of spare blue sub-pixels and a plurality of spare red sub-pixels. A spare red sub-pixel is disposed in corresponding one gird between a green sub-pixel and a red sub-pixel which are adjacent to each other. A spare blue sub-pixel is disposed in corresponding one grid between a green sub-pixel and a blue sub-pixel which are adjacent to each other, or the spare blue sub-pixel is disposed in corresponding one gird between a red sub-pixel and a blue sub-pixel which are adjacent to each other.

In an example, the program further includes instructions for performing actions/operations in the following.

Controlling the light-emitting unit corresponding to the preset region of the touch display screen to emit light having a target brightness, wherein the target brightness is brightness of the touch display screen when the touch display screen is normally displayed and configured for illuminating the fingerprint of the user.

Acquiring the fingerprint illuminated by the light having the target brightness emitted from the light-emitting unit corresponding to the preset region of the touch display screen.

Determining the user's finger as a dry finger when sharpness of the acquired fingerprint under the light having the target brightness is less than a preset threshold.

As it can been, in the embodiments provided by the present disclosure, when the fingerprint is collected, the brightness illuminating the fingerprint of the user is increased, and then the quality of the collected fingerprint is improved.

Figure 7:
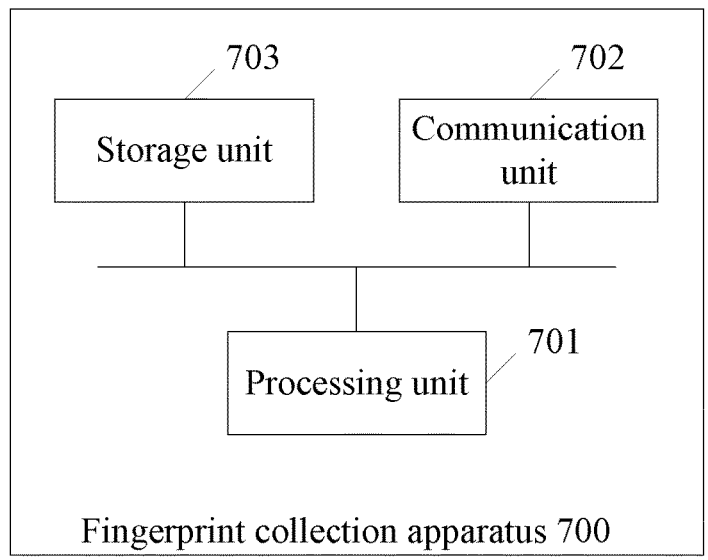
FIG. 7 is a schematic structural diagram of an apparatus for collecting a fingerprint according to embodiments of the present disclosure.

FIG. 7 is a schematic structural diagram of an apparatus 700 for collecting a fingerprint according to embodiments of the present disclosure. The apparatus is applied to a terminal device including an optical fingerprint sensor and a touch display screen, wherein the touch display screen includes a preset region, the optical fingerprint sensor is disposed below the preset region. The apparatus includes a processing unit 701, a communication unit 702, and storage unit 703.

The processing unit 701 is configured to control the light-emitting unit corresponding to the preset region of the touch display screen to emit light, wherein brightness of light emitted from a light-emitting unit corresponding to the preset region of the touch display screen is greater than brightness of light emitted from other light-emitting unit corresponding to other region of the touch display screen.

The processing unit 701 may be a processor or controller (e.g., a central processing unit (CPU), a general purpose processor, a digital signal processor (DSP), an application specific integrated circuit (ASIC), a Field Programmable Gate Array (FPGA) or other programmable logic devices, transistor logic devices, hardware components, or any combination thereof, which may be implemented or executed in conjunction with various example logical blocks, modules, and circuits in the present disclosure. The processor may also be a combination of computing functions, for example, including a combination of one or more microprocessor, a combination of a DSP and a microprocessor, and the like. The communication unit 702 can be a transceiver, a transceiver circuit, a radio frequency chip, a communication interface, etc., and the storage unit 703 can be a memory.

When the processing unit 701 is a processor, the communication unit 702 is a communication interface, and the storage unit 703 is a memory, the apparatus according to the embodiment of the present disclosure may be the terminal device as shown in FIG. 6.

Figure 8:
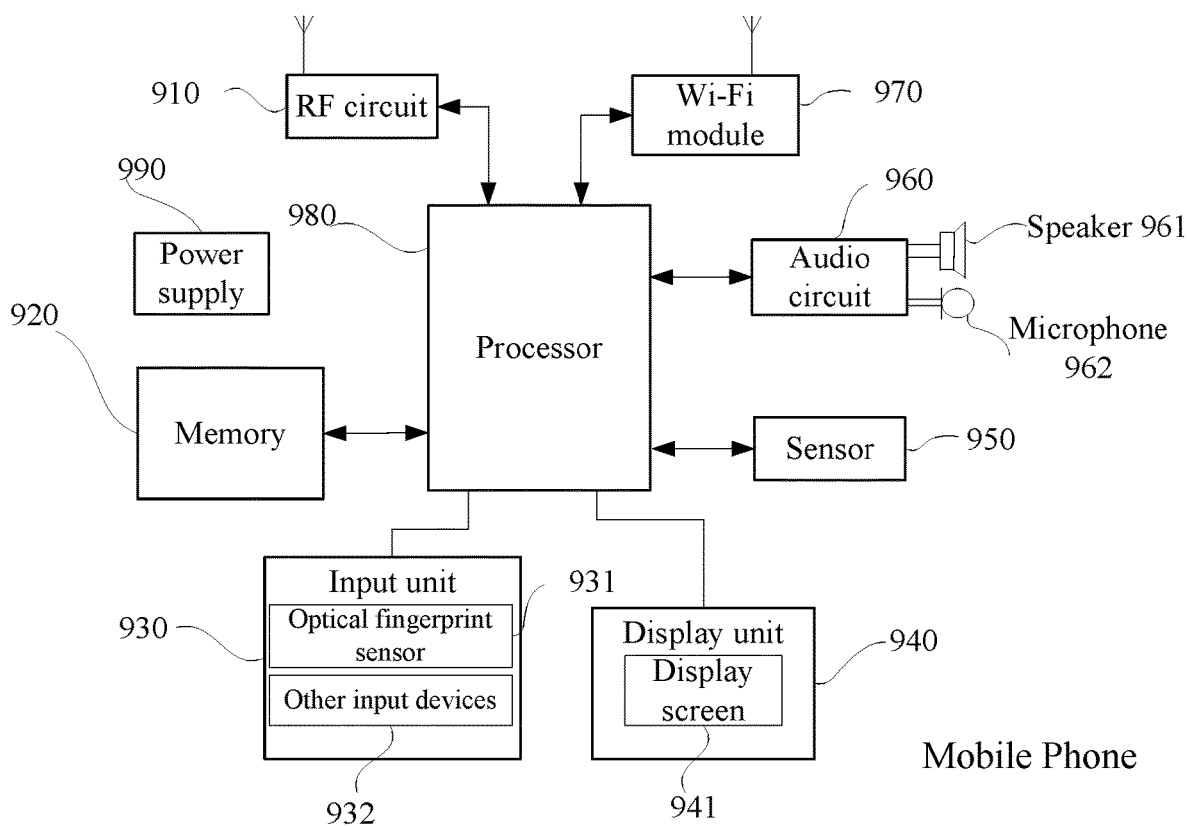
FIG. 8 is a schematic structural diagram of another terminal device according to embodiments of the present disclosure.

Another mobile terminal is further provided in an embodiment of the present disclosure. As shown in FIG. 8, for the convenience of description, only the parts related to the embodiments of the present disclosure are shown. If the specific technical details are not disclosed, please refer to the method part of the embodiment of the present disclosure. The mobile terminal may be any terminal device including a mobile phone, a tablet computer, a PDA (Personal Digital Assistant), a POS (Point of Sales), an in-vehicle computer, and the like. The mobile terminal is used as a mobile phone as an example:

FIG. 8 is a block diagram showing a partial structure of a mobile phone related to a mobile terminal provided by an embodiment of the present disclosure. As shown in FIG. 8, the mobile phone includes a radio frequency (RF) circuit 910, a memory 920, an input unit 930, a display unit 940, a sensor 950, an audio circuit 960, a wireless fidelity (Wi-Fi) module 970, a processor 980, and a power supply 990. It will be understood by those skilled in the art that the structure of the mobile phone as shown in FIG. 8 does not constitute a limitation to the mobile phone, and may include more or less components than those illustrated, or some components may be combined, or different component arrangements.

The components of the mobile phone will be described in detail with reference to FIG. 8 in the following.

The RF circuit 910 can be used for receiving and emitting information. Usually, the RF circuit includes, but not limited to, an antenna, at least one amplifier, a transceiver, a coupler, a Low Noise Amplifier (LNA), a duplexer and so on. In addition, the RF circuit may further communicate with other devices via wireless communication and a network. The above wireless communication may use any communication standard or protocol, including but not limited to Global System of Mobile communication (GSM), General Packet Radio Service (GPRS), Code Division Multiple Access (Code Division), Multiple Access (CDMA), Wideband Code Division Multiple Access (WCDMA), Long Term Evolution (LTE), E-mail, Short Messaging Service (SMS), and the like.

The memory 920 may be configured to store software programs and modules, and the processor 980 executes various function applications and data processing of the mobile phone by running the software programs and the modules stored in the memory 920. The memory 920 may mainly include a program storage region and a data storage region, wherein the program storage region may store an operation system, application programs for at least one function (for example, an audio playing function, an image playing function, etc.), and the data storage region may store data (for example, audio data, telephone directory, etc.) created according to use of the mobile phone. In addition, the memory 920 may include a high-speed RAM, and may further include a non-volatile memory such as at least one of a disk storage device, a flash device, or other non-volatile solid storage devices.

The input unit 930 may be configured to receive input digital or character information and generate key signal input associated with user setting and functional control of the mobile phone. Specifically, the input unit 930 can include an optical fingerprint sensor 931 and other input devices 932. The optical fingerprint sensor 931 can collect data of a user's fingerprint. In addition to the optical fingerprint sensor 931, the input unit 930 may also include other input devices 932. Specifically, the other input devices 932 may include, but not limited to, one or more of a physical keyboard, a functional key (such as a volume control key and a switch key), a track ball, a mouse, an operating rod, etc.

The display unit 940 can be used to display information input by the user or information provided to the user as well as various menus of the mobile phone. The display unit 940 may include a display screen 941, which is alternatively configured to be a Liquid Crystal Display (LCD), an Organic Light-Emitting Diode (OLED) and the like.

The mobile phone may also include at least one type of sensor 950, such as a light sensor, motion sensor, and other sensors. Specifically, the light sensor may include an ambient light sensor (also called light sensor) and a proximity sensor, wherein the ambient light sensor may adjust the brightness of the display screen 941 according to the brightness of the ambient light, and the proximity sensor may turn off the display screen 941 and/or backlight when the mobile phone is moved to the ear. As a motion sensor, the accelerometer sensor can detect the magnitude of acceleration in all directions (usually three axes). When it is stationary, it can detect the magnitude and direction of gravity, which can be used to identify the gesture of the mobile phone (such as horizontal and vertical screen switching, related games, magnetometer attitude calibration), vibration recognition related functions (such as pedometer, tapping), etc. Other sensors such as gyroscopes, barometers, hygrometers, thermometers, infrared sensors can be configured on the mobile phone, which are no longer described herein.

An audio circuit 960, a speaker 961 and a microphone 962 may provide an audio interface between the user and the mobile phone. The audio circuit 960 can convert the received audio data to the electrical data and then emit to the speaker 961. The speaker 961 then converts to the sound signal. On the other hand, the microphone 962 converts the collected sound signal into an electrical signal. The audio circuit 960 receives the electrical signal and then convert it into audio data. The processor 980 processes the audio data and then transmits another mobile phone via the RF circuit 910, or transmits to the memory 920 for further processing.

Wi-Fi belongs to a short-range wireless transmission technology. The mobile phone may assist the user to receive and send e-mails, webpage browsing, access to streaming media and the like by means of the Wi-Fi module 970, which provides a wireless wideband internet access for the user. Although the Wi-Fi module 970 is illustrated in FIG. 8, it may be understood that, it may be optional components of the mobile phone and may totally be omitted without changing the essence of the present disclosure as claimed.

The processor 980 is a control center of the mobile phone, which is connected to all parts of the mobile phone by utilizing various interfaces and lines and execute various functions and processing data of the mobile phone by running or executing the software program and/or the module stored in the memory and calling data stored in the memory 920. Thus, it wholly monitors the mobile phone. Optionally, the processor 980 may include one or more processing units. The processor 980 may be integrated with an application processor and a modulation-demodulation processor. The application processor mainly processes an operation system, a user interface, an application program and the like, and the modulation-demodulation processor mainly processes wireless communication. It will be appreciated that the above described modulation-demodulation processor may also not be integrated into the processor 980.

The mobile phone also includes a power supply 990 (such as a battery) that supplies power to the various components. Preferably, the power supply can be logically coupled to the processor 980 through a power management system to manage functions such as charging, discharging, and power management through the power management system.

Although not shown, the mobile phone may further include a camera, a Bluetooth module, and the like, which are not described in detail herein again.

In the foregoing embodiments shown in FIG. 5, each actions/operation of the method can be implemented based on the structure of the mobile phone.

In the foregoing embodiments shown in FIG. 7, each function unit can be implemented based on the structure of the mobile phone.

A computer storage medium is further provided in embodiments of the present disclosure. The computer storage medium stores computer programs for electronic data exchange. The computer programs cause a computer to perform some or all of the actions of any of the methods for collecting a fingerprint described in the foregoing embodiments.

A computer program product is provided in embodiments of the present disclosure. The computer program product includes a non-transitory computer readable storage medium storing a computer program. The computer programs cause a computer to perform some or all of the actions of any of the methods described in the foregoing embodiments.

It should be noted that, for the foregoing method embodiments, for the sake of brevity, they are all described as a series of action combinations, but those skilled in the art should understand that the present disclosure is not limited by the described action sequence. Because certain steps may be performed in other sequences or concurrently in accordance with the present disclosure. In the following, those skilled in the art should also understand that the embodiments described in the specification are all preferred embodiments, and the actions and modules involved are not necessarily required by the present disclosure.

In the above embodiments, the descriptions of the various embodiments are all focused on, and the parts that are not detailed in a certain embodiment can be referred to the related descriptions of other embodiments.

In several embodiments provided herein, it should be understood that the disclosed apparatus may be implemented in other ways. For example, the device embodiments described above are merely illustrative. For example, the division of the above units is only a logical function division. In actual implementation, there may be another division manner. For example, multiple units or components may be combined or integrated to another system, or some features can be ignored or not executed. In addition, the mutual coupling or direct coupling or communication connection shown or discussed may be an indirect coupling or communication connection through some interface, device or unit, and may be electrical or otherwise.

The units described above as separate components may or may not be physically separated, and the components illustrated as units may or may not be physical units, which may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or each unit may exist physically separately. Alternatively, two or more units may also be integrated into one unit. The above integrated unit can be implemented in the form of hardware or in the form of a software functional unit.

The above-described integrated unit can be stored in a computer readable memory if it is implemented in the form of a software functional unit and sold or used as a standalone product. Based on such understanding, the technical solution of the present disclosure, in essence or the contribution to the prior art, or all or part of the technical solution may be embodied in the form of a software product. The software product is stored in a memory, which includes a number of instructions causing a computer device (which may be a personal computer, server or network device, etc.) to perform all or part of the actions of the above-described methods of various embodiments of the present disclosure. The foregoing memory includes a U disk, a Read-Only Memory (ROM), a Random Access Memory (RAM), a removable hard disk, a magnetic disk, or an optical disk, and the like, which can store program codes.

One of ordinary skill in the art can understand that all or part of the various methods of the above embodiments can be completed by related hardware instructed by a program. The program can be stored in a computer readable memory, and the memory can include a flash drive, read-only memory (ROM), random access memory (RAM), disk or CD.

The embodiments of the present disclosure have been described in detail above, and the principles and implementations of the present disclosure are described in the specific examples. The description of the above embodiments is only used to help understand the method of the present disclosure and its core ideas. For a person skilled in the art, there will have a change in the specific embodiments and the scope of present disclosure according to the idea of the present disclosure. In summary, the content of the present specification should not be construed as limiting the present disclosure.

What is claimed is:

1. A terminal device, comprising an optical fingerprint sensor and a touch display screen, wherein the touch display screen comprises a preset region, and the optical fingerprint sensor is disposed below the preset region, wherein brightness of light emitted from a light-emitting unit corresponding to the preset region of the touch display screen is greater than brightness of light emitted from another light-emitting unit corresponding to another region of the touch display screen, in response to an operation of the optical fingerprint sensor collecting a fingerprint, wherein the light-emitting unit in the preset region of the touch display screen comprises a set of pixels and a set of spare sub-pixels, wherein pixels in the set of pixels and spare sub-pixels in the set of spare sub-pixels emit light in response to the operation of the optical fingerprint sensor collecting the fingerprint, and wherein the spare sub-pixels in the set of spare sub-pixels do not emit light in response to the optical fingerprint sensor not collecting the fingerprint.

2. The terminal device of claim 1, wherein the set of pixels comprising a plurality of pixels, each pixel comprises a green sub-pixel, a red sub-pixel, and a blue sub-pixel, such that the light-emitting unit comprises a set of green sub-pixels, a set of red sub-pixels, and a set of blue sub-pixels, and wherein all sub-pixels in the set of green sub-pixels, the set of red sub-pixels, and the set of blue sub-pixels are controlled to emit green light collectively with keeping power consumption of the terminal device constant when the optical fingerprint sensor collects the fingerprint.

3. The terminal device of claim 1, wherein a grid is between any two adjacent sub-pixels of the set of pixels.

4. The terminal device of claim 3, wherein each of the spare sub-pixels in the set of spare sub-pixels is disposed in one grid; and each of the spare sub-pixels in the set of spare sub-pixels is configured for emitting light with a single color.

5. The terminal device of claim 4, wherein the single color is a single green, a single red, or a single blue.

6. The terminal device of claim 3, wherein the set of spare sub-pixels comprises a plurality of spare blue sub-pixels and a plurality of spare red sub-pixels; wherein each of the spare red sub-pixels is disposed in a corresponding one grid between a green sub-pixel and a red sub-pixel in the set of pixels which are adjacent to each other; and at least one of: each of the spare blue sub-pixels is disposed in a corresponding one grid between a green sub-pixel and a blue sub-pixel in the set of pixels which are adjacent to each other, or each of the spare blue sub-pixel is disposed in a corresponding one grid between a green sub-pixel and a red sub-pixel in the set of pixels which are adjacent to each other.

7. A method for collecting a fingerprint, applied to a terminal device comprising an optical fingerprint sensor, and a touch display screen, the touch display screen comprising a preset region, wherein the optical fingerprint sensor is disposed below the preset region, comprising:

controlling a light-emitting unit corresponding to the preset region of the touch display screen to emit light, wherein brightness of the light emitted from the light-emitting unit corresponding to the preset region of the touch display screen is greater than brightness of light emitted from another light-emitting unit in another region of the touch display screen; and acquiring the fingerprint illuminated by the light emitted from the light-emitting unit corresponding to the preset region of the touch display screen, wherein the light-emitting unit in the preset region of the touch display screen comprises a set of pixels and a set of spare sub-pixels, wherein pixels in the set of pixels and spare sub-pixels in the set of spare sub-pixels emit light in response to the operation of the optical fingerprint sensor collecting the fingerprint, and wherein the spare sub-pixels in the set of spare sub-pixels do not emit light in response to the optical fingerprint sensor not collecting the fingerprint.

8. The method of claim 7, wherein the set of pixels comprising a plurality of pixels, each pixel comprises a green sub-pixel, a red sub-pixel, and a blue sub-pixel, such that the light-emitting unit comprises a set of green sub-pixels, a set of red sub-pixels, and a set of blue sub-pixels, and wherein all sub-pixels in the set of green sub-pixels, the set of red sub-pixels, and the set of blue sub-pixels are controlled to emit green light collectively with keeping power consumption of the terminal device constant when the optical fingerprint sensor collects the fingerprint.

9. The method of claim 7, wherein a grid is between any two adjacent sub-pixels of the set of pixels.

10. The method of claim 9, wherein each of the spare sub-pixels in the set of spare sub-pixels is disposed in one grid; and each of the spare sub-pixels in the set of spare sub-pixels is configured for emitting light with a single color.

11. The method of claim 10, wherein the single color is a single green, a single red, or a single blue.

12. The method of claim 9, wherein the set of spare sub-pixels comprises a plurality of spare blue sub-pixels and a plurality of spare red sub-pixels; wherein each of the spare red sub-pixels is disposed in a corresponding one grid between a green sub-pixel and a red sub-pixel in the set of pixels which are adjacent to each other; and at least one of: each of the spare blue sub-pixels is disposed in a corresponding one grid between a green sub-pixel and a blue sub-pixel in the set of pixels which are adjacent to each other, or each of the spare blue sub-pixel is disposed in a corresponding one grid between a green sub-pixel and a red sub-pixel in the set of pixels which are adjacent to each other.

13. The method of claim 7, wherein the acquired fingerprint illuminated by the light emitted by the light-emitting unit corresponding to the preset region of the touch display screen is a fingerprint of a dry finger.

14. The method of claim 7, further comprising:

controlling the light-emitting unit corresponding to the preset region of the touch display screen to emit light having a target brightness, wherein the target brightness is a brightness when the touch display screen is normally displayed;

acquiring another fingerprint illuminated by the light having the target brightness;

determining whether sharpness of the other fingerprint illuminated by the light having the target brightness is less than a preset threshold; and performing the controlling the light-emitting unit in the preset region of the touch display screen to emit light having brightness that is greater than brightness of light emitted by a light-emitting unit in the other region of the touch display screen when the sharpness of the other fingerprint is less than the preset threshold.

15. A non-transitory storage medium storing one or more programs, when executed, causing a processor to perform a method for collecting a fingerprint, wherein the method comprises:

controlling a light-emitting unit corresponding to a preset region of a touch display screen to emit light having brightness that is greater than brightness of light emitted by a light-emitting unit in another region of the touch display screen, in response to an operation of an optical fingerprint sensor collecting a fingerprint; and acquiring the fingerprint illuminated by the light having brightness that is greater than brightness of light emitted by a light-emitting unit in the other region of the touch display screen, wherein the light-emitting unit in the preset region of the touch display screen comprises a set of pixels and a set of spare sub-pixels, wherein pixels in the set of pixels and spare sub-pixels in the set of spare sub-pixels emit light in response to the operation of the optical fingerprint sensor collecting the fingerprint, and wherein the spare sub-pixels in the set of spare sub-pixels do not emit light in response to the optical fingerprint sensor not collecting the fingerprint.

16. The non-transitory storage medium of claim 15, wherein the set of pixels comprising a plurality of pixels, each pixel comprises a green sub-pixel, a red sub-pixel, and a blue sub-pixel, such that the light-emitting unit comprises a set of green sub-pixels, a set of red sub-pixels, and a set of blue sub-pixels, and wherein all sub-pixels in the set of green sub-pixels, the set of red sub-pixels, and the set of blue sub-pixels are controlled to emit green light collectively with keeping power consumption of the terminal device constant when the optical fingerprint sensor collects the fingerprint.

17. The non-transitory storage medium of claim 15, wherein a grid is between any two adjacent sub-pixels of the set of pixels; and wherein the set of spare sub-pixels comprises a plurality of spare blue sub-pixels and a plurality of spare red sub-pixels; wherein each of the spare red sub-pixels is disposed in a corresponding one grid between a green sub-pixel and a red sub-pixel in the set of pixels which are adjacent to each other; and at least one of: each of the spare blue sub-pixels is disposed in a corresponding one grid between a green sub-pixel and a blue sub-pixel in the set of pixels which are adjacent to each other, or each of the spare blue sub-pixel is disposed in a corresponding one grid between a green sub-pixel and a red sub-pixel in the set of pixels which are adjacent to each other.

* * * * *